(12) United States Patent
Ariton

(10) Patent No.: US 11,834,912 B2
(45) Date of Patent: Dec. 5, 2023

(54) HIGH PRESSURE CABLE HEAD CONNECTOR

(71) Applicant: Roxar Flow Measurement AS, Stavanger (NO)

(72) Inventor: Sergiu Ariton, Stavanger (NO)

(73) Assignee: ROXAR FLOW MEASUREMENT AS, Stavanger (NO)

( * ) Notice: Subject to any disclaimer, the term of this patent is extended or adjusted under 35 U.S.C. 154(b) by 339 days.

(21) Appl. No.: 17/277,212

(22) PCT Filed: Sep. 18, 2019

(86) PCT No.: PCT/EP2019/074980
§ 371 (c)(1),
(2) Date: Mar. 17, 2021

(87) PCT Pub. No.: WO2020/064455
PCT Pub. Date: Apr. 2, 2020

(65) Prior Publication Data
US 2022/0034169 A1    Feb. 3, 2022

(30) Foreign Application Priority Data
Sep. 24, 2018   (NO) .................................. 20181235

(51) Int. Cl.
*F16L 19/10*   (2006.01)
*E21B 17/04*   (2006.01)
(Continued)

(52) U.S. Cl.
CPC ............ *E21B 17/04* (2013.01); *E21B 17/023* (2013.01); *F16L 19/103* (2013.01); *H02G 15/04* (2013.01)

(58) Field of Classification Search
CPC ....... F16L 19/045; F16L 19/046; F16L 19/08; F16L 19/083; F16L 19/086; F16L 19/10;
(Continued)

(56) References Cited

U.S. PATENT DOCUMENTS

| 2,459,608 A | 1/1949 | Wolfram |
| 2,870,841 A | 1/1959 | Conrad et al. |

(Continued)

FOREIGN PATENT DOCUMENTS

| GB | 1317484 A | 5/1973 |
| GB | 1602356 A | 11/1981 |
| GB | 2287997 A | 10/1995 |

OTHER PUBLICATIONS

Hennion, Dmitri; International Search Report; PCT/EP2019/074980; dated Dec. 10, 2019; 6 pages.

*Primary Examiner* — Aaron M Dunwoody
(74) *Attorney, Agent, or Firm* — Bradley Arant Boult Cummings

(57) ABSTRACT

A sealing cable connector device for high-pressure applications includes a first connector part and a second connector part including an axial channel for allowing a cable to extend, the first connector part having a cylindrical channel with a radially oriented inner surface and the second connector part being adapted to be introduced into said channel and having a corresponding shape in the radial direction, said second connector part having a radially oriented front end surface, the first and second connector parts including locking means being adapted to applying an axial force and lock the parts together after connecting. At least one spring bevel ring is positioned at the inner surface in said cavity having radial dimensions corresponding to radial dimensions of the cavity between the cable and outer walls of the cavity.

14 Claims, 3 Drawing Sheets

(51) Int. Cl.
*E21B 17/02* (2006.01)
*H02G 15/04* (2006.01)

(58) Field of Classification Search
CPC ......... F16L 19/103; F16L 19/12; F16L 25/01; F16L 33/223; F16L 37/0844; F16L 37/091; F16L 47/12
USPC ...................................................... 285/902
See application file for complete search history.

(56) References Cited

U.S. PATENT DOCUMENTS

| | | | |
|---|---|---|---|
| 3,325,192 A | 6/1967 | Sullivan | |
| 3,445,128 A | 5/1969 | Teeters | |
| 3,985,379 A | 10/1976 | Normark | |
| 4,229,027 A | 10/1980 | Morrill | |
| 5,730,476 A * | 3/1998 | Gouda | F16L 19/103 285/369 |
| 5,823,256 A | 10/1998 | Moore | |

* cited by examiner

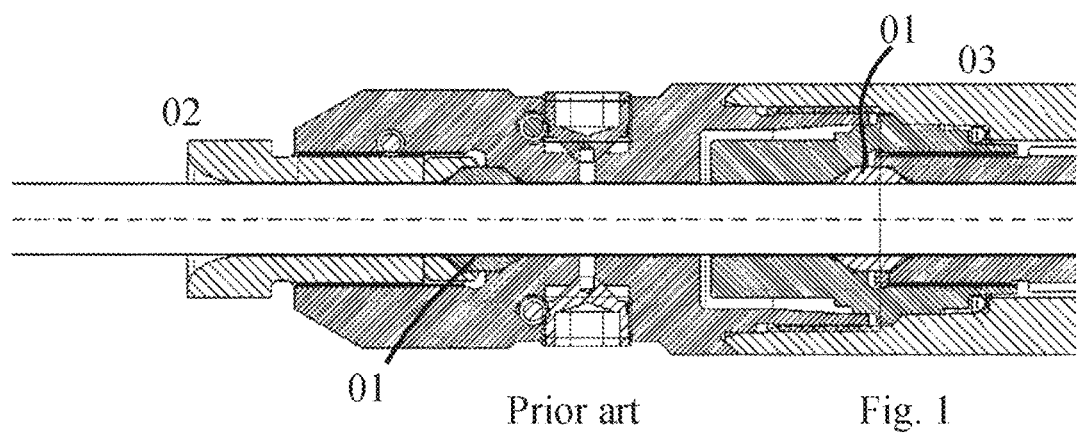
Prior art    Fig. 1
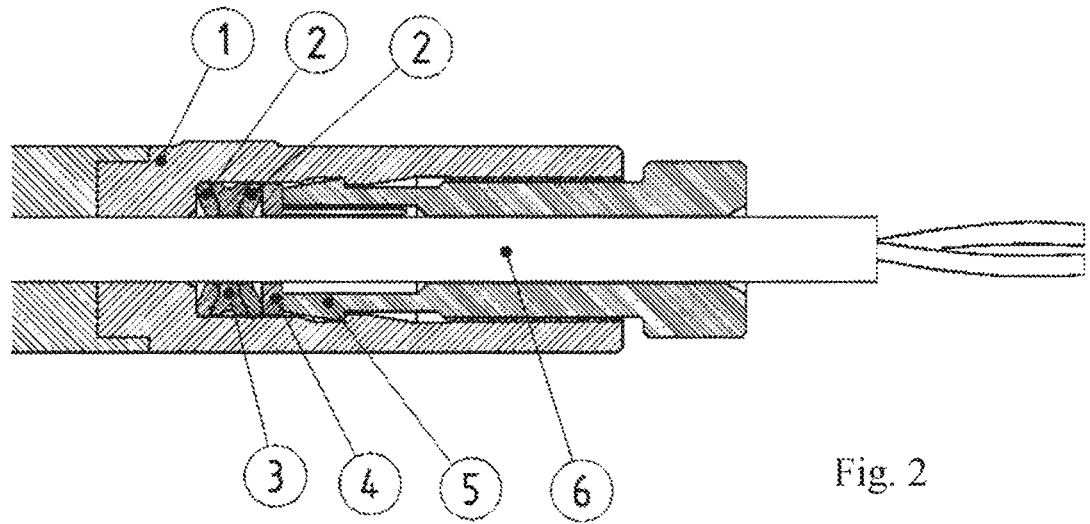
Fig. 2

HIGH PRESSURE CABLE HEAD CONNECTOR

BACKGROUND

Technical Field

The present invention relates to a high-pressure cable head connector, e.g. for connecting downhole cable with gauge for use in downhole completion.

Description of Related Art

A cable head is part of the downhole gauge tool used for connecting a downhole cable to a gauge and need to ensure and protect connection of the downhole cable with the gauge with a double barrier metal to metal seals.

Known solutions for high pressure environments have included complicated structures with a number of sealing rings. One example of the prior art is presented in FIG. 1 where two rings 01 are forced in the radial direction when the connector parts 02,03 are pushed in the longitudinal direction. This solution requires that the surface of the cable is smooth in order to give the sealing rings 01 sufficient contact with the cable surface, and the number of parts needed for providing two pressure barriers increases the risk of failure. Examples showing such solutions are well known within the field and may be found in GB2287997, U.S. Pat. Nos. 5,823,256, 3,445,128 and 3,325,192. A slightly different solution is presented in U.S. Pat. No. 3,985,379 where a frustoconical ring is used to increase the force on part of the sleeve toward the pipe, this increasing the friction, but still the limitations discussed above apply as the force is distributed to avoid deforming the pipe material.

SUMMARY

It is an object of the present invention to provide a relatively inexpensive connector with high pressure integrity, which is easily assembled in offshore applications while reducing the required qualification of the users. More specifically the objective problem may be defined as to create a connection seal with a high pressure integrity both outside against housing and inside against metal pipe or cable. The objective problem to be solved according to the preferred embodiment of the invention is how to create a double metal connection seal, outside against housing and inside against a pipe or cable with a hard, usually metal, surface. Note that "cable" in the present specification should also be interpreted as "pipe" under comparable situations The present invention relates generally to metal to metal seal and particularly to a resilient metal bevel seal embedded between a cable head housing and a ¼" downhole tubing encapsulated cable (TEC). More specifically the present invention is characterized as presented in the accompanying claims.

This provides a seal interface for sealing against outside pressure and in the same time for inside pressure of the well fluid in conditions of high pressure and high temperature. This is provided by forcing the sealing ring both outward into the connector housing and inward to the cable surface, the cable surface being made from a metal or another material having similar characteristics. In a preferred embodiment two rings are used for redundancy.

The present invention utilizes ring shaped bevel springs that are compressed to a predetermined deflection, generating a sealing stress by the resilient bevel spring seal shape. This way a compact connector is provided using less parts and thus minimizing the risk of failure, and that is easy to assemble, thus reducing the time to rig a system. The components may be used as is without contact preparations of the cable.

The barriers provided by the present invention are thus obtained by radial deformation and elastic stress in the contact area. direct on the sealing elements, without any intermediate part.

It is essential for the present invention is to achieve two barriers of the same level and in the same time, both sealing against HPHT (high pressure, high temperature) fluid, outside against the housing and inside against the pipe from tubing encased cable (TEC).

In Addition:

Seals are deformed in control manner and all the time in the same fixed and locked position.

The two sealing barriers testable independent in the flow direction.

Both barriers are equals in terms of capability of sealing against fluid with high pressure and high temperature Both barriers have a controlled deformation to achieve the same contact stress.

Both seals have capability to seal HPHT in both direction, from right to left and vice versa.

BRIEF DESCRIPTION OF DRAWINGS

The invention will be described more in detail with reference to the accompanying drawings, illustrating the invention by way of examples.

FIG. 1 illustrates the prior art.

FIG. 2 illustrates a longitudinal cross section of the preferred embodiment of the invention.

DETAILED DESCRIPTION

Figure 3:
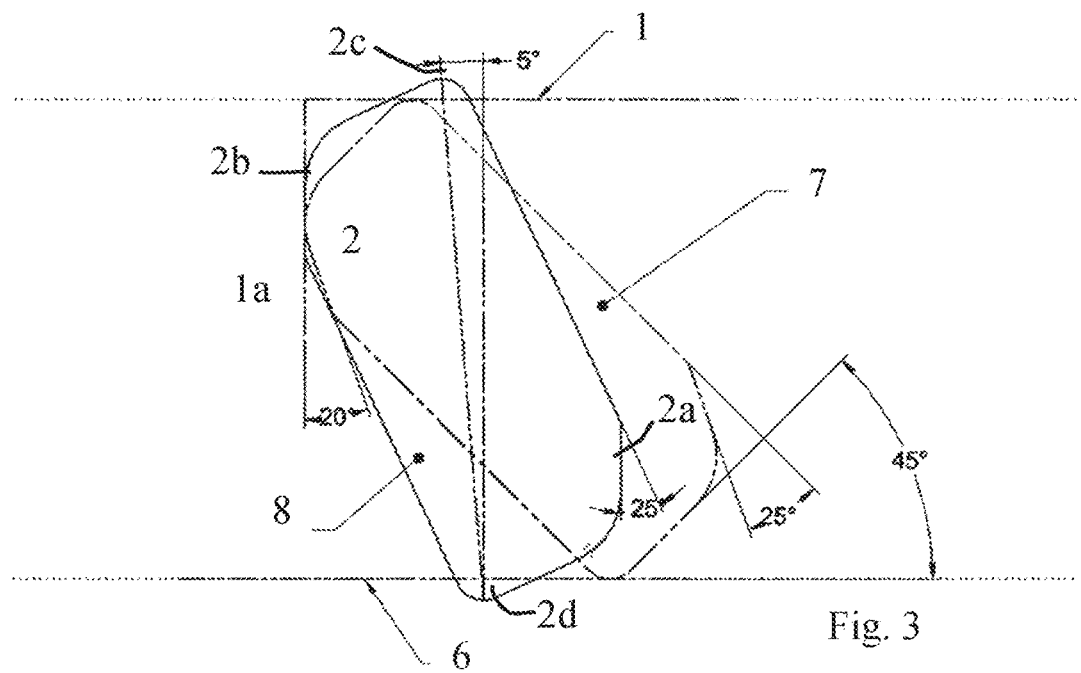
FIG. 3 illustrates the sealing mechanism of the invention.

As is illustrated in FIG. 2 the sealed connector according to the invention includes a first connector part 1 and a second connector part 5 adapted to be locked or screwed together applying an axial force towards each other. A cable or pipe 6, preferably a TEC or other cables with a hard, outer surface, extends through the connector.

As can be seen from the drawing two bevel rings 2 are positioned between the first and second parts in the axial direction. The front end of the second connector part 5 and the inner surface of the first connector part have radially plane section and the bevel rings 2 have a frustoconical shape defining an angle relative to the radial and axial directions. In FIG. 2 the bevel rings are tilted in opposite directions toward each other with a stopper ring 3 between them. The stopper ring 3 limits how much the shape of the bevel rings 2 can change when the connector parts 1 and 5 are pressed together, limiting the force toward, and deformation of, the outer part of the cable 6. Preferably a front end 4 of the second connector part 5 includes a low friction element surface 4a to be able to rotate relative to the bevel ring 2 if screwed into the first connector part 1.

FIG. 3 illustrates the function of the bevel rings 2. The bevel ring cross section is shown as a rounded essentially rectangular shape in two situations, the uncompressed position 7 and the compressed position 8. Before the compression the bevel ring 2 in the illustrated example 7 has an angle of 45° relative to the longitudinal axis corresponding to both the inner house surface of the first connector part 1 and the outer surface of the cable 6. After being subject to a longitudinal force toward an inner wall 1a of the first connector part 1 by the front end 4 of the second connector part 5, the bevel ring 2 is tilted, e.g. by 5° as illustrated in the compressed position 8, in which case an outer edge 2c of the bevel ring 2 is forced in the radial direction into the inner surface of the first connector part 1 and an inner edge 2d toward the outer surface of the cable 6. This forces a close connection between the surfaces and the bevel ring 2 and thus sealing the connection between the first connector part 1 and the cable 6.

Thus, when the axial pressure is applied, the bevel seals 2 are embedded into a housing 1 and compressed against a cable head housing 6 shoulder, preferably by a metallic threaded locker part until the flat surface of the bevel seals are mating with flat surface from cable head housing respective to the flat surface of the locker part.

As can be seen from the cross section of the bevel ring 2 in FIG. 3, the rounded rectangular shape is preferably about 2:1 ratio between radial dimension and thickness, and may include a cut off edge 2a toward the front end of the second connector part 5, having an angle, e.g. 25° in the case when the bevel ring is tilted by 45°, from the bevel seal surface. This is to receive the front end 4 of the second connector part 5 (not shown in FIG. 3), and, when a tilt of 5° has been applied, the cut off edge 2a is perpendicular to the longitudinal direction and thus parallel to the front end 4 of the second connector part 5. This will stop the tilting at 5 degrees, before amplitude point of rotation, thus protecting the cable 6 and the housing 1. A similar cut off edge 2b may also be provided interacting with the inner wall 1a of the first connector part 1. This will create a controlled contact stress to avoid the TEC to be deformed on the inner wall against the cable 6.

The stopper ring 3 illustrated in FIG. 2 may have the same function in providing a bed stopping for the tilt at a certain angle where the sealing is obtained without applying more stress or deforming the bevel seal, cable 6 or housing 1 more than an allowed degree.

Bevel seals will have an axial movement and in the same time a rotation with 20 degrees, stopping rotation with 5 degrees before amplitude of the movement between the bevel seal and housing and respective downhole cable. This way a spring back force is obtained as well as protection of the parts.

During the movement and after, a spring back force will exert uniform pressure on the sealing interface and keeps a preset load on the seal with an equal distribution outside to the housing 1 and inside to the cable 6. Compressed bevel seal system is capable to provide a pressure integrity mechanism which form a pressure seal on a tubular wall both outside and inside. A locking mechanism may be used to avoid relaxing the bevel seals by unscrewing locking part.

Figure 4:
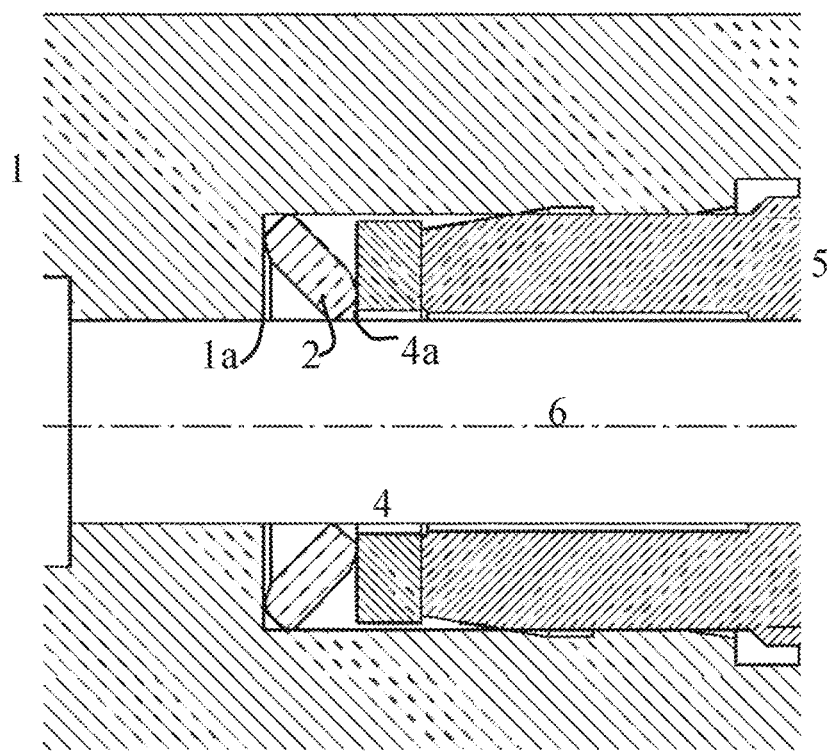
FIG. 4 illustrates a simplified embodiment of the invention.
Figure 5:
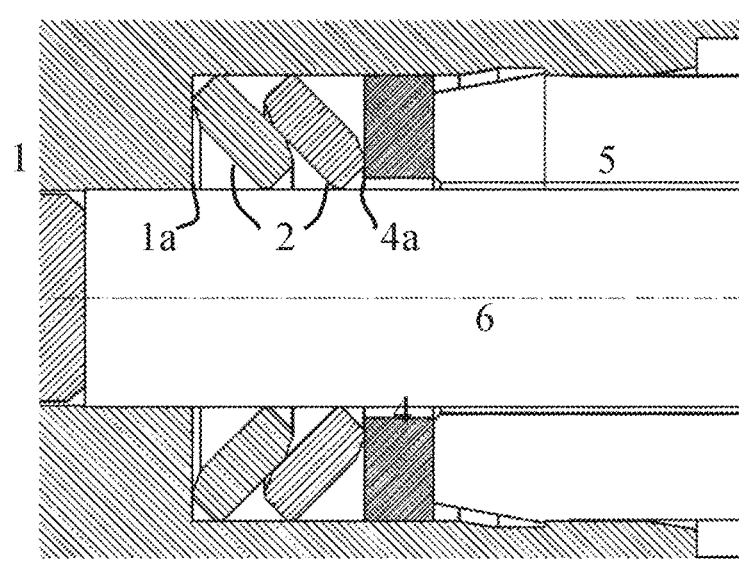
FIG. 5 illustrates an alternative embodiment of the invention.

FIGS. 4 and 5 illustrates alternative embodiments where FIG. 4 only includes one bevel seal 2, compressed between the front surface 4 of the second connector part and the inner surface 1a of the first connector part 1. In FIG. 5 a similar solution is shown where two bevel rings are used, providing a redundancy in the sealing. In these figures the rectangular cross sections show cutoffs on both sides of the bevel rings, both on the inner surface 1a and the front surface 4.

The present invention thus relates to a high pressure cable head connector, e.g. for connecting downhole cable to a measurement device, e.g. a pressure sensor, for use in downhole completion. The sealing cable connection device is made for high pressure applications including a first connector part and a second connector part including an axial channel for allowing a cable or pipe to extend, where the cable preferably has an outer surface made of metal or another hard material that can be deformed when subject to a force. The first connector part 1 having a cylindrical channel with a radially oriented inner surface 1a and the second connector part 5 being adapted to be introduced into said channel and having a corresponding shape in the radial direction, said second connector part having a radially oriented front end surface 4a. The cavity being coaxially oriented around the cable channel 6. The first and second connector parts include locking means being adapted to applying an axial force and lock the parts together after connecting.

The inner volume of said receiving cavity includes at least one bevel ring 2 having radial dimensions corresponding to the radial dimensions of the cavity between the cable and the outer walls of the cavity, the bevel rings preferably having an essentially frustoconical shape in the longitudinal direction. At the application of said axial force the outer parts of said bevel rings are forced into said cavity wall as well as into a cable or pipe in said cable channel, thus deforming the material in the cavity wall and cable. Preferably the cavity walls and bevel ring(s) are made from a metal and the cable or pipe is a tubing encapsuled cable with a hard or metal outer surface. Preferably the material for tubing encapsulate cable is nickel alloy 625 or nickel alloy 825 and the bevel seal rings are made from nickel alloy 718. Other bevel ring shapes may also be contemplated as long as they provide a force in the radial direction when subject to an axial force The first and second connector parts may be threaded so that the axial force is applied by screwing the parts together. and/or may be provided with other locking mechanisms.

Preferably the bevel rings are constituted by springs exerting high contact stress equal for contact between said outer wall of said cavity and the ring and outer surface of the cable. The bevel rings may be adapted to, when compressed, act like an energized spring who exerts high contact stress equal to compensate thermal expansion of the parts.

The present invention thus provides a first seal barrier for sealing between a connector housing 1 and cable pipe 6 for protecting cable connection against well fluid. Preferably a second seal barrier is used to ensure redundancy of the primary seal. This is obtained using one or more bevel rings 2. Preferably two bevel rings are used being oriented back to back. Thus two bevel rings may provide a double bevel seal technology based on metal to metal sealing for HPHT (High Pressure, High Temperature) environment based on the shape of the seal, preferably being suitable for 25000 psi and 225° C. degrees.

As the bevel rings preferably have frustoconical shapes, the at least one bevel rings are rotated around cross intersection of the shape diagonals, as shown and discussed in relation to FIG. 3 in the controlled manner to ensure maximum contact stress against tubing encapsulate cable and in the same time against outer wall of the cavity when subject to an axial force. The bevel ring or rings are preferably stopped all the time in the same, predetermined position as provided by the cut off edge 2a or by the limiter 3 in FIG. 2.

Using two bevel rings will have the advantage of providing two sealing barriers in the same time, preferably with the same leak proof capability of under HPHT (High Pressure High Temperature) conditions.

The invention claimed is:

1. A sealing cable connector device for high pressure applications, the sealing cable connector device comprising:
a first connector part and a second connector part forming an axial cable channel for allowing a cable to extend therethrough, the cable having a cross section comparable to dimensions of the axial cable channel, the first connector part having a cylindrical connector channel with an inner surface having a larger cross section than the axial cable channel, and the second connector part being adapted to be introduced into the cylindrical connector channel and having a corresponding shape in a radial direction to the inner surface of the first connector part, the second connector part having a radially oriented front end surface;
wherein a cavity is defined between the inner surface and the front end surface, the cavity being coaxially oriented around the axial cable channel, the first connector part and the second connector part each being adapted to apply an axial force and lock the first connecting part and the second connecting part together after connecting;
wherein at least one spring bevel ring is positioned at the inner surface in the cavity and has radial dimensions corresponding to radial dimensions of the cavity between the axial cable channel and the inner surface of the cylindrical connector channel;
wherein the at least one spring bevel ring has a radial cross section having a rectangular shape with rounded corners and an angle relative to a longitudinal axis of the axial cable channel;
wherein, responsive to application of an axial force between the first connector part and the second connector part, the at least one spring bevel ring is configured to be tilted between the inner surface and the front end surface and forced in the radial direction both into the inner surface of the first connector and into the axial cable channel so as to provide a sealing interaction both outward between the at least one spring bevel ring and the inner surface of the first connector and inward between the at least one spring bevel ring and the cable; and
wherein the at least one spring bevel ring is adapted, when compressed, to interact with at least one of the front end surface of the second connector part and the inner surface of the first connector part and act like an energized spring that exerts high contact stress outward into the inner surface and inward into the axial cable channel to compensate for thermal expansion of the first connector part and the second connector part.

2. The sealing cable connector device according to claim 1, wherein the first connector part and the at least one spring bevel ring are made from a metal.

3. The sealing cable connector device according to claim 1, wherein the first connector part and the second connector part are threaded, the axial force being applied by screwing the first connector part and the second connector part together.

4. The sealing cable connector device according to claim 1, comprising two spring bevel rings, the two spring bevel rings being positioned so as to have respective radially outer parts of the two spring bevel rings extending from each other.

5. The sealing cable connector device according to claim 4, wherein the two spring bevel rings are configured to exert high contact stress equal for contact between the inner surface of the first connector and the two spring bevel rings and an outer surface of the cable.

6. The sealing cable connector device according to claim 1, wherein the inner surface and the at least one spring bevel ring are made of metals.

7. The sealing cable connector device according to claim 6, wherein a material for tubing encapsulating the cable is nickel alloy 625 or nickel alloy 825 and the at least one spring bevel ring is made from nickel alloy 718.

8. The sealing cable connector device according to claim 1, wherein the at least one spring bevel ring has a frusto-conical shape in the longitudinal direction.

9. The sealing cable connector device according to claim 8, wherein the at least one spring bevel ring is tilted in controlled manner responsive to application of an axial force so as to ensure maximum contact stress against tubing encapsulate cable and in the same time against the inner surface.

10. The sealing cable connector device according with claim 9, wherein the at least one spring bevel ring is stopped by a stopper ring.

11. The sealing cable connector device according with claim 1, wherein the at least one spring bevel ring comprises two spring bevel rings providing two sealing barriers at the same time.

12. The sealing cable connector device according with claim 1, wherein the at least one spring bevel ring comprises two spring bevel rings providing two sealing barriers with the same leak proof capability in high pressure high temperature ("HPHT") conditions.

13. The sealing cable connector device according to claim 1, wherein an initial angle of a cross section of the at least one spring bevel ring in an uncompressed state is 45° relative to the longitudinal axis.

14. The sealing cable connector device according to claim 1, wherein a rectangular shape cross section of the at least one spring bevel ring has at least one cut off edge at a corner thereof, the at least one cut off edge being adapted to interact with at least one of the radially oriented front end surface of the second connector part and the inner surface of the first connector part, an angle of the cut off edge being chosen so as to be parallel to the radially oriented front end surface when the at least one spring bevel ring is compressed.

* * * * *